(12) United States Patent
Sasson et al.

(10) Patent No.: US 11,372,723 B2
(45) Date of Patent: Jun. 28, 2022

(54) DYNAMICALLY ADJUSTING A JOURNAL SNAPSHOT WINDOW

(71) Applicant: International Business Machines Corporation, Armonk, NY (US)

(72) Inventors: Ben Sasson, North Baddesley (GB); Lee Jason Sanders, Chichester (GB); Gordon Douglas Hutchison, Eastleigh (GB); Florent Rostagni, Eastleigh (GB)

(73) Assignee: International Business Machines Corporation, Armonk, NY (US)

(*) Notice: Subject to any disclaimer, the term of this patent is extended or adjusted under 35 U.S.C. 154(b) by 484 days.

(21) Appl. No.: 16/667,666

(22) Filed: Oct. 29, 2019

(65) Prior Publication Data

US 2021/0124649 A1   Apr. 29, 2021

(51) Int. Cl.

| | |
|---|---|
| *G06F 11/00* | (2006.01) |
| *G06F 11/14* | (2006.01) |
| *G06F 12/02* | (2006.01) |
| *G06F 16/11* | (2019.01) |
| *G06F 11/07* | (2006.01) |
| *G06F 11/10* | (2006.01) |

(52) U.S. Cl.
CPC ...... *G06F 11/1451* (2013.01); *G06F 11/0727* (2013.01); *G06F 11/1076* (2013.01); *G06F 11/1471* (2013.01); *G06F 12/0253* (2013.01); *G06F 16/128* (2019.01); *G06F 2201/84* (2013.01); *G06F 2212/1044* (2013.01)

(58) Field of Classification Search
CPC ............ G06F 12/0253; G06F 16/1815; G06F 11/0727; G06F 11/073; G06F 11/0754; G06F 11/0793; G06F 11/1008; G06F 11/1076; G06F 11/1451; G06F 11/1612; G06F 11/1471; G06F 11/2053; G06F 11/2064; G06F 11/22; G11C 29/88
See application file for complete search history.

(56) References Cited

U.S. PATENT DOCUMENTS

| | | | | |
|---|---|---|---|---|
| 5,287,363 | A * | 2/1994 | Wolf | G11B 20/1252 714/39 |
| 7,774,313 | B1 * | 8/2010 | Nachenberg | G06F 11/1471 707/694 |
| 8,707,107 | B1 * | 4/2014 | Panna | G06F 11/008 714/25 |

(Continued)

*Primary Examiner* — Michael Maskulinski
(74) *Attorney, Agent, or Firm* — Kunzler Bean & Adamson (57) ABSTRACT

An apparatus for dynamically adjusting a journal snapshot window is disclosed. A computer-implemented method and computer program product also perform the functions of the apparatus. According to an embodiment of the present invention, a failure detection module detects a potential failure of at least a portion of a non-volatile storage device. The non-volatile storage device includes a journal for tracking metadata changes for data that is stored on the non-volatile storage device prior to committing the metadata changes to metadata for the non-volatile storage device. A notification receiving module receives an indication of the potential failure of the non-volatile storage device. A snapshot module adjusts a snapshot window for the journal in response to the indication of the potential failure. The snapshot window includes a set of metadata changes in the journal that have not been committed to the metadata of the non-volatile storage device.

20 Claims, 7 Drawing Sheets

(56) References Cited

U.S. PATENT DOCUMENTS

| | | | |
|---|---|---|---|
| 10,572,323 B1* | 2/2020 | Zhai | G06F 11/008 |
| 2011/0173484 A1* | 7/2011 | Schuette | G11C 29/00 |
| | | | 714/E11.029 |
| 2013/0013564 A1 | 1/2013 | Ben-Or et al. | |
| 2014/0181585 A1* | 6/2014 | Hoang | G06F 11/3034 |
| | | | 714/26 |
| 2015/0205657 A1* | 7/2015 | Clark | G06F 11/008 |
| | | | 714/47.3 |
| 2017/0116248 A1 | 4/2017 | Konik et al. | |
| 2017/0139781 A1 | 5/2017 | Camp et al. | |
| 2018/0300197 A1 | 10/2018 | Marron | |
| 2019/0198097 A1* | 6/2019 | Kim | G11C 16/0483 |
| 2020/0218619 A1* | 7/2020 | Hwang | G06F 12/0804 |

* cited by examiner

DYNAMICALLY ADJUSTING A JOURNAL SNAPSHOT WINDOW

BACKGROUND

The subject matter disclosed herein relates to data storage and more particularly relates to dynamically adjusting the snapshot window for a journal of a storage device.

SUMMARY

An apparatus for dynamically adjusting a journal snapshot window is disclosed. A computer-implemented method and computer program product also perform the functions of the apparatus. According to an embodiment of the present invention, a failure detection module detects a potential failure of at least a portion of a non-volatile storage device. The non-volatile storage device includes a journal for tracking metadata changes for data that is stored on the non-volatile storage device prior to committing the metadata changes to metadata for the non-volatile storage device. In some embodiments, a notification receiving module receives an indication of the potential failure of the non-volatile storage device. In further embodiments, a snapshot module adjusts a snapshot window for the journal in response to the indication of the potential failure. The snapshot window includes a set of metadata changes in the journal that have not been committed to the metadata of the non-volatile storage device.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be an apparatus, a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses, systems, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of apparatuses, systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The description of elements in each figure may refer to elements of proceeding figures. Like numbers refer to like elements in all figures, including alternate embodiments of like elements.

An apparatus, in one embodiment, includes a failure detection module that detects a potential failure of at least a portion of a non-volatile storage device. The non-volatile storage device includes a journal for tracking metadata changes for data that is stored on the non-volatile storage device prior to committing the metadata changes to metadata for the non-volatile storage device. In some embodiments, the apparatus includes a notification receiving module that receives an indication of the potential failure of the non-volatile storage device. In further embodiments, the apparatus includes a snapshot module that adjusts a snapshot window for the journal in response to the indication of the potential failure. The snapshot window includes a set of metadata changes in the journal that have not been committed to the metadata of the non-volatile storage device.

In one embodiment, the snapshot module adjusts the snapshot window by increasing a number of metadata changes that are tracked within the snapshot window prior to committing the metadata changes to the metadata of the non-volatile storage device. In certain embodiments, the snapshot module adjusts the snapshot window by reducing a frequency with which the metadata changes within the snapshot window are committed to the metadata of the non-volatile storage device.

In some embodiments, a degree to which the snapshot window is adjusted is determined according to a severity of the potential failure of the non-volatile storage device. In various embodiments, the failure detection module is further configured to detect that the non-volatile storage device has recovered from the potential failure. In one embodiment, the failure detection module resets the adjusted snapshot window for the journal in response to detecting that the non-volatile storage device has recovered from the potential failure.

In one embodiment, the apparatus includes a garbage collection module that postpones garbage collection of data on the non-volatile storage device that is no longer referenced by the metadata. In certain embodiments, the garbage collection module postpones garbage collection in response to determining that new data stored on the non-volatile storage device is stored in an area of the non-volatile storage device that may be impacted by the potential failure. In some embodiments, the garbage collection module resumes normal garbage collection in response to the snapshot window of the journal being committed to the metadata for the non-volatile storage device and in response to the potential failure being resolved.

In one embodiment, the apparatus includes a write module that prevents new data from being written to an area of the non-volatile storage device that may be impacted by the potential failure. In some embodiments, the failure detection module detects the potential failure of the non-volatile storage device in response to detecting a threshold number of parity errors in a redundant array of independent disks ("RAID") that the non-volatile storage device is part of, detecting a component in doubt ("CID") associated with the non-volatile storage device, detecting a threshold write latency for the non-volatile storage device, and/or detecting a threshold number of read errors when using the metadata to read from the non-volatile storage device.

In one embodiment, a method includes detecting a potential failure of at least a portion of a non-volatile storage device. The non-volatile storage device includes a journal for tracking metadata changes for data that is stored on the non-volatile storage device prior to committing the metadata changes to metadata for the non-volatile storage device. In some embodiments, the method includes receiving an indication of the potential failure of the non-volatile storage device and adjusting a snapshot window for the journal in response to the indication of the potential failure. The snapshot window includes a set of metadata changes in the journal that have not been committed to the metadata of the non-volatile storage device.

In one embodiment, adjusting the snapshot window comprises increasing a number of metadata changes that are tracked within the snapshot window prior to committing the metadata changes to the metadata of the non-volatile storage device. In certain embodiments, adjusting the snapshot window comprises reducing a frequency with which the metadata changes within the snapshot window are committed to the metadata of the non-volatile storage device. In various embodiments, the degree to which the snapshot window is adjusted is determined according to a severity of the potential failure of the non-volatile storage device.

In one embodiment, the method includes detecting that the non-volatile storage device has recovered from the potential failure and resetting the adjusted snapshot window for the journal in response to detecting that the non-volatile storage device has recovered from the potential failure.

In one embodiment, the method includes postponing garbage collection of data on the non-volatile storage device that is no longer referenced by the metadata. In various embodiments, garbage collection is postponed in response to determining that new data stored on the non-volatile storage device is stored in an area of the non-volatile storage device that may be impacted by the potential failure. In some embodiments, the method includes resuming normal garbage collection in response to the snapshot window of the journal being committed to the metadata for the non-volatile storage device and in response to the potential failure being resolved.

Figure 1:
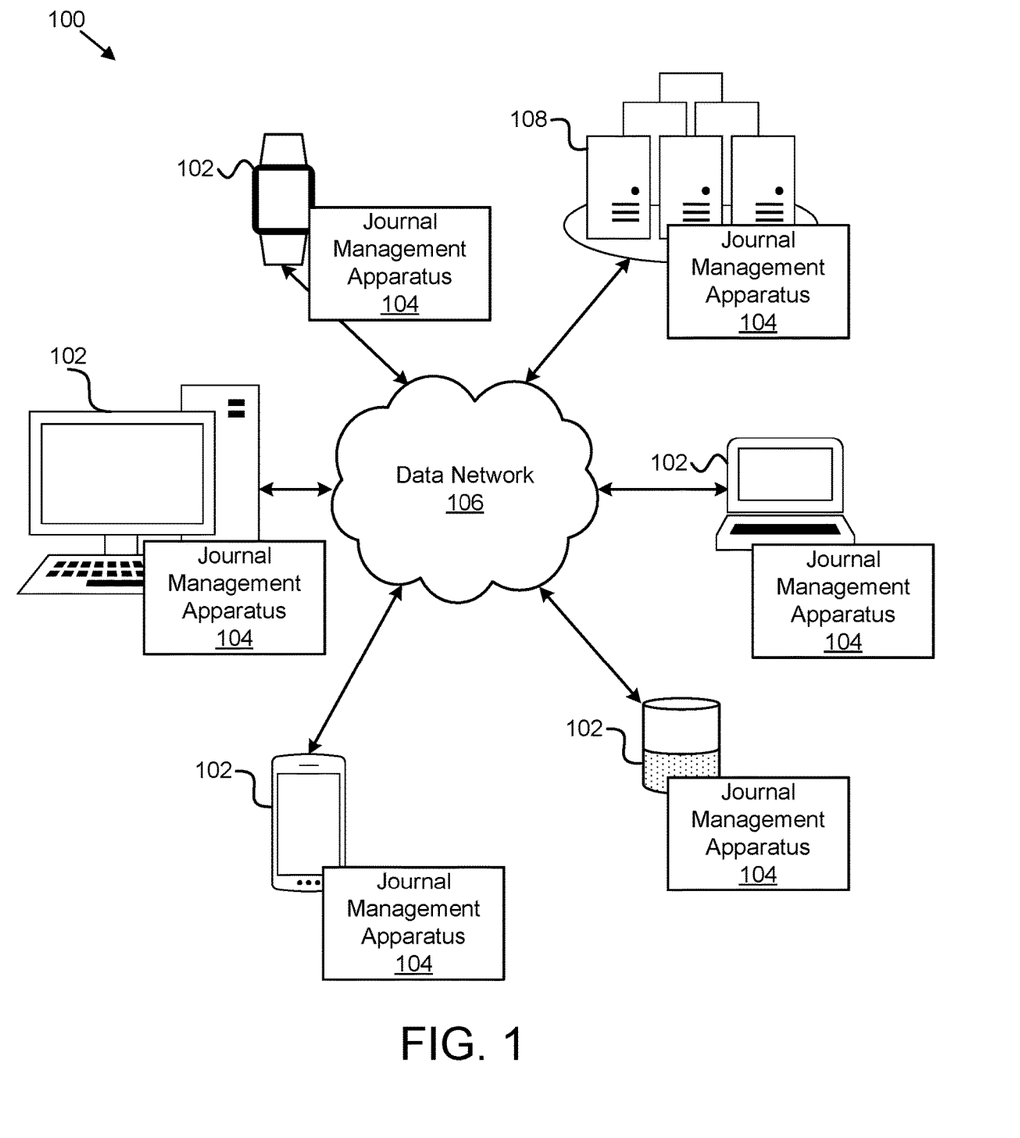
FIG. 1 is a schematic block diagram illustrating one embodiment of a system for dynamically adjusting a journal snapshot window.

A computer program product, in one embodiment, includes a computer readable storage medium having program instructions embodied therewith. The program instructions, in certain embodiments, are executable by a processor to cause the processor to detect, by processor, a potential failure of at least a portion of a non-volatile storage device that includes a journal for tracking metadata changes for data that is stored on the non-volatile storage device prior to committing the metadata changes to metadata for the non-volatile storage device, receive, by processor, an indication of the potential failure of the non-volatile storage device, and adjust, by processor, a snapshot window for the journal in response to the indication of the potential failure. The snapshot window includes a set of metadata changes in the journal that have not been committed to the metadata of the non-volatile storage device FIG. 1 is a schematic block diagram illustrating one embodiment of a system 100 for dynamically adjusting a journal snapshot window. In one embodiment, the system 100 includes one or more information handling devices 102, one or more journal management apparatuses 104, one or more data networks 106, and one or more servers 108. In certain embodiments, even though a specific number of information handling devices 102, journal management apparatuses 104, data networks 106, and servers 108 are depicted in FIG. 1, one of skill in the art will recognize, in light of this disclosure, that any number of information handling devices 102, journal management apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

In certain embodiments, the information handling devices 102 are communicatively coupled to one or more other information handling devices 102 and/or to one or more servers 108 over a data network 106, described below. The information handling devices 102, in further embodiments, may include processors, processor cores, and/or the like that are configured to execute various programs, program code, applications, instructions, functions, and/or the like. The information handling devices 102 may be configured to execute artificial intelligence algorithms such as machine learning algorithms, deep learning algorithms, and/or the like.

In one embodiment, the journal management apparatus 104 is configured to detect a potential failure of a non-volatile storage device that includes a journal for tracking metadata changes for data that is stored on the non-volatile storage device prior to committing the metadata changes to metadata for the non-volatile storage device, receive an indication of the potential failure of the non-volatile storage device, and adjust a snapshot window for the journal in response to the indication of the potential failure. The journal management apparatus 104, including its various sub-modules, may be located on one or more information handling devices 102 in the system 100, one or more servers 108, one or more network devices, and/or the like. The journal management apparatus 104 is described in more detail below with reference to FIG. 3.

Many journaling storage systems or log structure array ("LSA") storage devices use some form of journal applied to a metadata snapshot or old copy to recover from metadata corruptions or similar disasters. A recovery process normally starts by restoring the old, trusted, copy of the metadata and then replaying a journal of updates on top of it to restore the view to the most up-to-date version. If, after performing the recovery operation, some areas of the metadata are pointing to corrupt/missing pieces of data on the backend, the system will usually have to fall back to returning an error (e.g., MEDIUM_ERROR) or zeros to host applications. This behavior is often not preferred by the hosts and can cause host application outages that are difficult to recover from.

To try and address this, some systems may perform a set of tests before applying journal updates. For example, some checks can include a read of the data pointed at by the update to check if present and deciding, based on the check result whether to apply the update or not. This process is time consuming and processor and I/O intensive. Naturally, the longer the history or journal available for the system to consider while recovering the better the opportunity to find stale, but still usable, data and not having to resort to returning an error (e.g., MEDIUM_ERROR) or zeros as described above.

Furthermore, certain LSA systems implement some form of garbage collection as a means to sustain overwrites over time. When an overwrite occurs, the system normally invalidates the previous location on the backend, subjecting it to a discard. If the new data has been put on a suspect backend device (e.g., a non-volatile storage device where a potential failure is detected) that ends up failing, there may not be older stale data to be found due to garbage collection.

Thus, the journal management apparatus 104 is configured to identify, or be notified of, an unreliable backend device or disk partition, and dynamically adjust the metadata snapshot window, which in turn will increase the journal replay window. If the non-volatile storage device fails and tries to recover the metadata, on average a longer history window is available, thus increasing the chances of stale, but potentially still valuable data to be found instead of only the most recent updates which could point to data that was lost due to the failure (e.g. due to a write cache loss).

In various embodiments, the journal management apparatus 104 may be embodied as a hardware appliance that can be installed or deployed on an information handling device 102, on a server 108, on a user's mobile device, on a display, or elsewhere on the data network 106. In certain embodiments, the journal management apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the journal management apparatus 104 may include a power interface, a wired and/or wireless network interface, a graphical interface that attaches to a display, and/or a semiconductor integrated circuit device as described below, configured to perform the functions described herein with regard to the journal management apparatus 104.

The journal management apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the journal management apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the journal management apparatus 104.

The semiconductor integrated circuit device or other hardware appliance of the journal management apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the journal management apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102. The servers 108 may comprise back-end servers that include a plurality of non-volatile storage devices for storing and serving data such as a server in a data center, a server that is part of a cluster or other distributed system, a cloud server, and/or the like.

Figure 2:
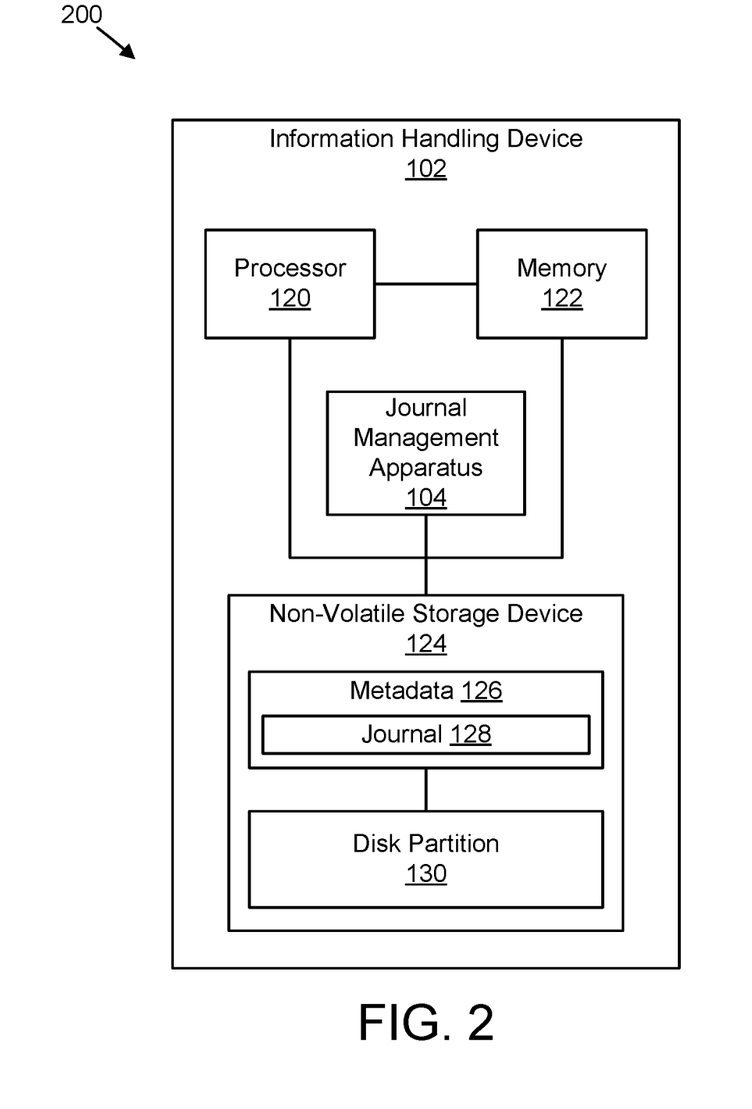
FIG. 2 is a schematic block diagram illustrating one embodiment of another system for dynamically adjusting a journal snapshot window.

FIG. 2 is a schematic block diagram illustrating one embodiment of another system 200 for dynamically adjusting a journal snapshot window. In one embodiment, the system 200 includes an information handling device 102 that includes a processor 120 and a memory 122 that is communicatively coupled to the processor 120. Other components may be included but not shown in FIG. 2 including network communication devices, graphics cards, sounds cards, and/or the like.

In one embodiment, the information handling device 102 includes a journal management apparatus 104, as mentioned above and described in more detail below, that is communicatively coupled to a non-volatile storage device 124. The non-volatile storage device 124 may include a hard disk drive, a flash drive, a solid-state storage drive, and/or any other non-volatile storage device 124 that can be used for storing data. The non-volatile storage device 124, in certain embodiments, includes a metadata 126 portion and a main disk partition 130, or multiple metadata 126 and disk partitions 130. The metadata 126 may be a portion of the non-volatile storage device 130 that stores information about the data in the disk partition 130 such as a mapping of logical block addresses to physical block addresses, read/write information, and/or the like. The metadata 126 may be embodied as a data structure (e.g., an array) of pointers or other references to the physical portions of the non-volatile storage device 124 where the referenced data is stored.

The metadata 126 may include a journal 128 for sequentially tracking updates, e.g., writes, to the metadata 126 that are not yet committed to the metadata 126. The journal 128 may be embodied as a circular log or buffer, or any other suitable data structure for storing sequential data. The journal 128, in certain embodiments, allows metadata changes to be written sequentially, which is faster than performing a seek and then a write because sequential writes take less time than the seek time for the non-volatile storage device 124. In the event of a system crash or power failure, the non-volatile storage device 124 can be brought back online more quickly with a lower likelihood of becoming corrupted using a journal 128 because the metadata 126 is known to be in a stable state and the journal 128 can be replayed (e.g., data in the journal can be written to the metadata 126) when the non-volatile storage device 124 is in a stable state to commit data to the metadata 126. In such an embodiment, a file system check process such as "fsck" does not need to be run to recreate the metadata 126 because the metadata 126 is known to be in a stable state, with uncommitted changes being stored in the journal 128 to be committed at a later, stable point.

The journal 128, in certain embodiments, may include a snapshot window or replay window that includes a set of data that has not yet been written to the metadata 126. The snapshot window may be set at a predetermined size, e.g., a predetermined size of data, may be written to the metadata 126 at a predetermined frequency, e.g., every minute, hour, etc., and/or the like. In certain embodiments, committing the data in the journal snapshot window to the metadata 126 may include updating pointers or other references in the metadata 126 to the data stored on the disk partition 130, as explained below with reference to FIGS. 5A-5B. The disk partition 130 may include an entire disk or a portion of disk such as a storage volume, an erase block, an area or sector of a hard drive, a word line, a page, a byte, a bit, and/or the like where data can be physically stored for long-term storage.

Figure 3:
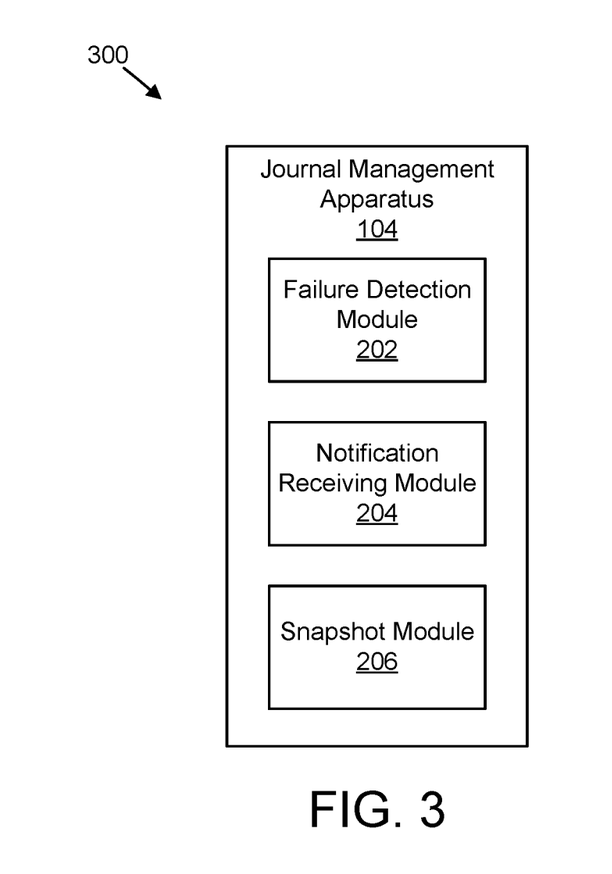
FIG. 3 is a schematic block diagram illustrating one embodiment of an apparatus for dynamically adjusting a journal snapshot window.

FIG. 3 is a schematic block diagram illustrating one embodiment of an apparatus 300 for dynamically adjusting a journal snapshot window. In one embodiment, the apparatus 300 includes an instance of a journal management apparatus 104. The journal management apparatus 104, in certain embodiments, includes a failure detection module 202, a notification receiving module 204, and a snapshot module 206, which are described in more detail below.

In one embodiment, the failure detection module 202 is configured to detect a potential failure of a non-volatile storage device 124 that includes a journal 128 for tracking changes to metadata 126 for data that is stored on the non-volatile storage device 124 prior to committing the metadata changes to metadata 126 for the non-volatile storage device 124, an example of which is illustrated in FIG. 2. The potential failure may be a potential hardware or mechanical failure, a potential software or firmware failure, and/or the like. The potential failure may impact the non-volatile storage device 124 as a whole (rendering the entire device unusable), may impact a portion of the device 124 (e.g., a sub-area of the device 124 such as an erase block, a page, a chip, a circuit board, a disk partition, a sector, a volume, a word line, a platter, a spindle, a read/write arm, an actuator, or the like), and/or the like. As used herein, a potential failure may be a problem with the non-volatile storage device 124, e.g. a component or portion of the non-volatile storage device 124 that may cause it to not behave normally, to not function as designed, and/or the like, such as not performing various functions normally like storing data, writing data, reading data, accessing data, seeking data, and/or the like.

The failure detection module 202, in one embodiment, is configured to detect characteristics, settings, indicators, and/ or other signs that signal that the non-volatile storage device 124 is not behaving correctly and may fail. In one embodiment, for instance, the failure detection module 202 detects the potential failure of the non-volatile storage device 124 in response to detecting a threshold number of parity errors in a redundant array of independent disks ("RAID") that the non-volatile storage device 124 is part of (e.g., detecting, tracking, monitoring, or the like parity errors during read/ write operations that meet or exceed a threshold number of parity errors); in response to detecting a component in doubt ("CID") associated with the non-volatile storage device 124 (e.g., a component of the non-volatile storage device 124 or a component of a device coupled to the non-volatile storage device 124, or the like that is showing signs of failure); detecting a threshold write latency for the non-volatile storage device 124 (e.g., a write latency that meets or exceeds a previously defined latency threshold that is indicative of a failure); detecting a threshold number of read errors when using the metadata 126 to read data from the non-volatile storage device 124 (e.g., a number of read errors that meets or exceeds a previously defined error threshold that is indicative of a failure); and/or the like.

The failure detection module 202 may detect other signs of a potential failure with a non-volatile storage device 124 such as a number of program/erase cycles satisfying a program/erase cycle threshold; a temperature of the non-volatile storage device 124 satisfying a threshold temperature; a seek time of the non-volatile storage device 124 satisfying a threshold seek time; a system crash while accessing the non-volatile storage device 124; an age of the non-volatile device satisfying an age threshold; and/or the like. In certain embodiments, the failure detection module 202 may distinguish between indicators that signal different degrees of failure—indicators that signal that the non-volatile storage device 124 is failing now or will fail soon or may fail at some point in the future. For example, the failure detection module 202 may detect that problems with a read/write head component of a hard drive are more severe than detecting an increase in read/write latency of the hard drive.

In one embodiment, the notification receiving module 204 is configured to receive an indication of the potential failure of the non-volatile storage device 124. For instance, in one embodiment, the failure detection module 202 sends a signal, message, notification, sets a flag, or otherwise provides an indication that the non-volatile storage device 124 may fail. The notification may include the type of failure detected, an estimated time before the non-volatile storage device 124 will fail, components that are failing, a severity of the failure (e.g., on a scale of 1-10, or the like), and/or the like.

In one embodiment, the snapshot module 206 is configured to dynamically (e.g., in real-time, during execution, during runtime, or the like) adjust a snapshot window for the journal 128 in response to the notification receiving module 204 receiving an indication of the potential failure of the non-volatile storage device 124. As explained above, the snapshot window, otherwise known as the replay window, includes a set of metadata changes in the journal 128 that have not been committed to the metadata 126 of the non-volatile storage device 124, e.g., data that are sequentially written to the journal 128, but has yet to be written to the metadata 126.

The snapshot window may have a predefined or default size, e.g., a size of a certain number of bytes or data elements. For example, the snapshot window may be configured to store 128 bytes of data such that when 128 bytes of data are stored in the journal 128, but have yet to be written to the metadata 126, the write module 304, explained in more detail below, commits the data in the snapshot window to the metadata 128, and the snapshot window is reset. In some embodiments, the write module 304 commits the data in the snapshot window of the journal 128 to the metadata 126 at a predefined or default frequency, e.g., every second, every thirty seconds, every minute, every five minutes, every hour, or the like.

In one embodiment, the snapshot module 206 dynamically adjusts the snapshot window by increasing a number of metadata changes that are tracked/stored within the snapshot window prior to committing the metadata changes to the metadata 126 of the non-volatile storage device 124. For instance, the snapshot module 206 may increase the size of the snapshot window to capture more metadata changes in the journal 126 prior to committing the changes to the metadata 126. For example, the snapshot module 206 may increase the size of the snapshot window from 128 bytes to 512 bytes, or the like. Similarly, the snapshot module 206 may reset the size of the snapshot window to the default size, may reduce the size of the snapshot window, or the like.

In one embodiment, the snapshot module 206 dynamically adjusts the snapshot window by reducing a frequency with which the metadata changes within the snapshot window are committed to the metadata 126 of the non-volatile storage device 124. For instance, the snapshot module 206 may increase the amount of time that elapses before committing data in the snapshot window. For example, the snapshot module 206 may increase the amount of time that elapses before committing data in the journal 128 to the metadata 126 from every thirty seconds to every minute or from every minute to every five minutes, and so on. Similarly, the snapshot module 206 may reset the frequency with which the snapshot window is written to the metadata 126 to the default frequency, may increase the frequency, or the like.

In this manner, when the snapshot window is increased in size or the frequency with which the data in the snapshot window is committed to the metadata 126 is reduced, data that is written to the disk partition 130 is available for a longer amount of time because older, stale data that the metadata 126 no longer references will not be garbage collected until the data in the snapshot window is committed to the metadata 126 or until the non-volatile storage device 124 recovers from the potential failure. In conventional systems, data that is stored on the disk partition 130 may be deleted, e.g., through garbage collection, when the data is no longer referenced by the metadata 126. The subject matter disclosed herein, however, maintains a history of data in the disk partition 130 by dynamically adjusting the snapshot window (and postponing garbage collection in some embodiments) to increase the opportunity to locate stale data (e.g., data that is no longer valid or referenced by the metadata 126), but potentially still valuable data, while replaying the metadata changes in the snapshot window (e.g., when the device is started such as at boot time or when recovering from a system failure/crash) instead of only the most recent updates, which could point to/reference data on the disk partition 130 that is lost due to, for example, write cache loss or other data write error (e.g., system crash, power failure, etc.).

In one embodiment, a degree to which the snapshot module 206 dynamically adjusts the snapshot window is determined according to a severity of the potential failure of the non-volatile storage device 124. For instance, if there is an indication that the non-volatile storage device 124 may fail at any time, the snapshot module 206 may dynamically adjust the snapshot window so that the data changes are not committed to the metadata prior to the non-volatile storage device 124 failing. In other examples, if there is an indication that the non-volatile storage device 124 may fail within a short time period, e.g., within a day, a few days, a week, or the like, then the snapshot module 206 may dynamically adjust the snapshot window accordingly. In further examples, if there's an indication that the non-volatile storage device 124 may fail sometime within the next few weeks, months, or the like, the snapshot module 206 may not adjust the snapshot window at all or make minimal adjustments until more information regarding the failure is received.

In one embodiment, the failure detection module 202 is further configured to detect that the non-volatile storage device 124 has recovered from the potential failure. For example, the failure detection module 202 may detect that read/write latency for the non-volatile storage device 124 is below the latency threshold or that the CID for the non-volatile storage device 124 has been corrected or is working properly, or the like. In response to detecting that the non-volatile storage device 124 has recovered from the potential failure, the failure detection module 202 and/or the snapshot module 206 resets the adjusted snapshot window for the journal 128 to an original, default, predefined, or otherwise predetermined size or frequency.

Figure 4:
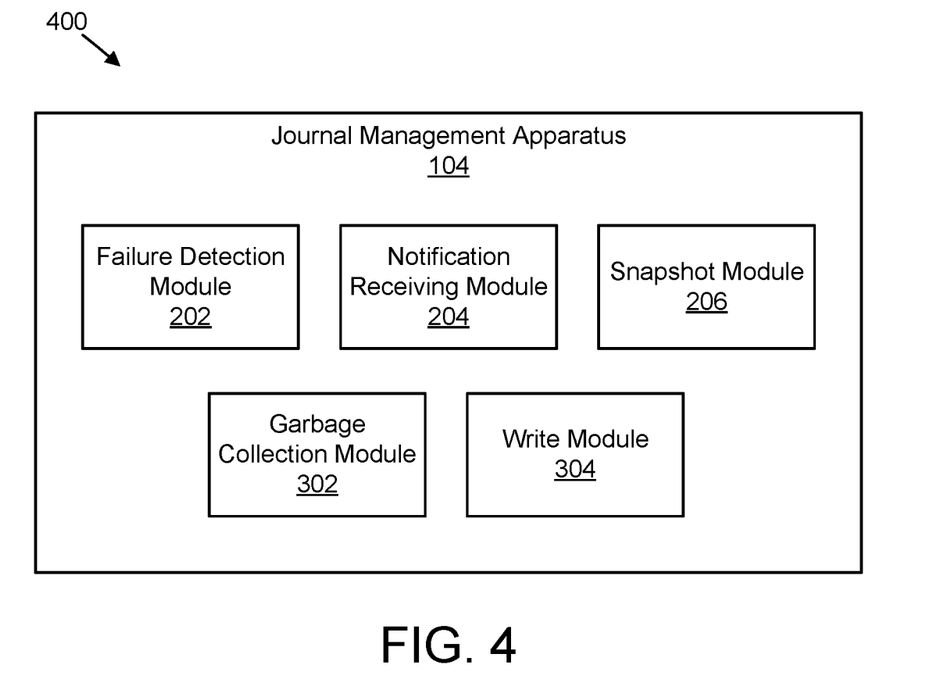
FIG. 4 is a schematic block diagram illustrating one embodiment of another apparatus for dynamically adjusting a journal snapshot window.

FIG. 4 is a schematic block diagram illustrating one embodiment of another apparatus 400 for dynamically adjusting a journal snapshot window. In one embodiment, the apparatus 400 includes an instance of a journal management apparatus 104. The journal management apparatus 104, in certain embodiments, includes a failure detection module 202, a notification receiving module 204, and a snapshot module 206, which are substantially similar to the failure detection module 202, the notification receiving module 204, and the snapshot module 206 described above with reference to FIG. 3. In further embodiments, the journal management apparatus 104 includes a garbage collection module 302 and a write module 304, which are described in more detail below.

In one embodiment, the garbage collection module 302 is configured to postpone garbage collection of data on the non-volatile storage device 124 that is no longer referenced by the metadata 126. As explained above, when new data is written to the disk partition 130, it may "overwrite" existing data, meaning it may be an updated version of some existing data that the metadata 126 will reference instead of the existing data. Because the metadata no longer references the existing data, the existing data is considered to be "stale" and will be a candidate for garbage collection. However, if the stale data is garbage collected before the journal snapshot window is committed to the metadata 126, and if there is a failure with the non-volatile storage device 124 and the new, updated data is lost, during replay both the new data and the old, stale data will be inaccessible, and the reference to the data in the metadata 126 will point to nothing, causing an error. Thus, by postponing garbage collection, the old, stale data may still be accessible in the event that the new, updated data is lost due to the failure of the non-volatile storage device 124.

In one embodiment, the garbage collection module 302 dynamically postpones garbage collection in response to determining that new data that is stored on the non-volatile storage device 124 is stored in an area of the non-volatile storage device 124 that may be impacted by the potential failure. For instance, if the potential failure is associated with a particular disk partition 130, or a portion of a disk partition 130, as determined by the failure detection module 202, and the new data is stored on that portion, the garbage collection module 306 may postpone garbage collection for a period of time, until the failure is no longer an issue, and/or the like. In certain embodiments, the garbage collection module 302 marks stale data that is associated with the new data that is stored in the portion of the non-volatile storage device 124 that may be impacted by the potential failure with a flag, bit, or other indicator that signals to the garbage collection service that the stale data should not be deleted. In this manner, the garbage collection service can still perform garbage collection for other data that is not impacted by the potential failure, while maintaining stale data that may still be usable in the future in the event of the failure.

In one embodiment, the garbage collection module 302 resumes normal garbage collection in response to the snapshot window of the journal 128 being committed to the metadata 126 for the non-volatile storage device 124 and the failure condition being resolved. Once the failure condition for the non-volatile storage device 124 is resolved and the snapshot window is committed to the metadata 126, the metadata 126 may be in a stable, reliable state, and therefore the garbage collection service can resume normal garbage collection operations on the non-volatile storage device 124.

In one embodiment, the write module 304 is configured to prevent new data from being written to an area of the non-volatile storage device 124 that may be impacted by the potential failure. For instance, in certain embodiments, the failure detection module 202 may identify the portions of the non-volatile storage device 124 that may be impacted by the potential failure (e.g., a sector, an erase block, a page, a volume, and/or the like) and the write module 304 may prevent new data from being written to the identified portions of the non-volatile storage device 124 that may be impacted by the potential failure. In this manner, new data can be written to reliable portions of the non-volatile storage device 124 to prevent data loss on the non-volatile storage device 124.

Figure 5A:
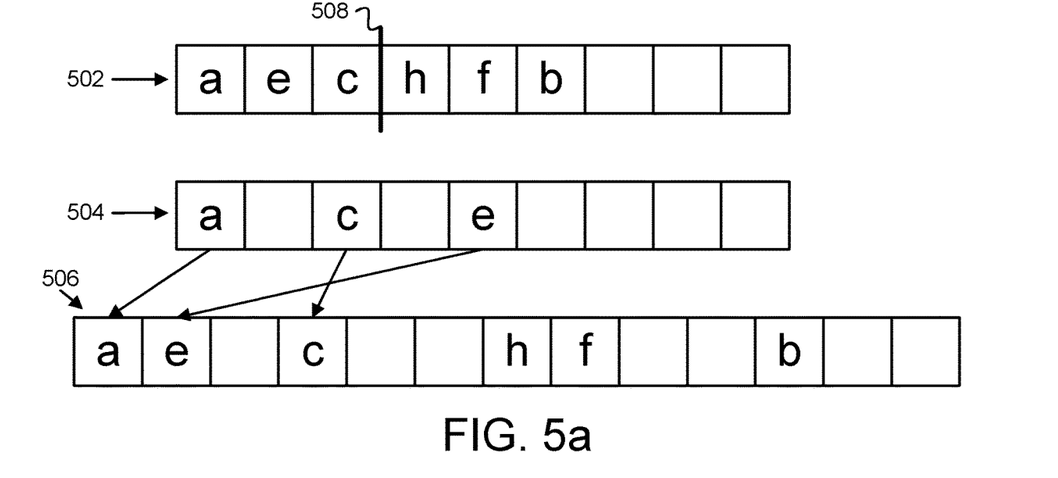
FIG. 5*a* is a schematic block diagram illustrating one example embodiment for dynamically adjusting a journal snapshot window.

FIG. 5a is a schematic block diagram illustrating one example embodiment for dynamically adjusting a journal snapshot window. In one embodiment, the example embodiment includes a journal 502, which may be substantially similar to the journal 128 described above, a metadata portion 504, which may be substantially similar to the metadata 126 described above, and a disk partition 506, which may be substantially similar to the disk partition 130 described above. The journal 502, metadata 504, and disk partition 506 may be part of or located on one or more non-volatile storage devices 124.

In FIG. 5a, the journal 502 includes references to data elements a, e, and c, that have already been committed to the metadata 504, as indicated by the references to the data elements a, e, and c in the metadata 504 referencing or pointing to the data elements a, e, and c as stored on the physical disk partition 506.

The journal 502 also includes references to data elements h, f, and b, which have been stored in the disk partition 506, but have yet to be committed to the metadata 504. The journal 502 also includes a marker, flag, or other indicator 508 that marks the point of the most recent snapshot window that was committed to the metadata 502. At that point 508, the data in the journal 502 (data elements a, e, and c) are written or committed to the metadata 504 so that the metadata 504 can reference the corresponding data elements in the disk partition 506. Thus, the references to the data elements h, f, and b in the journal 502 are not committed to the metadata 504 yet.

Figure 5B:
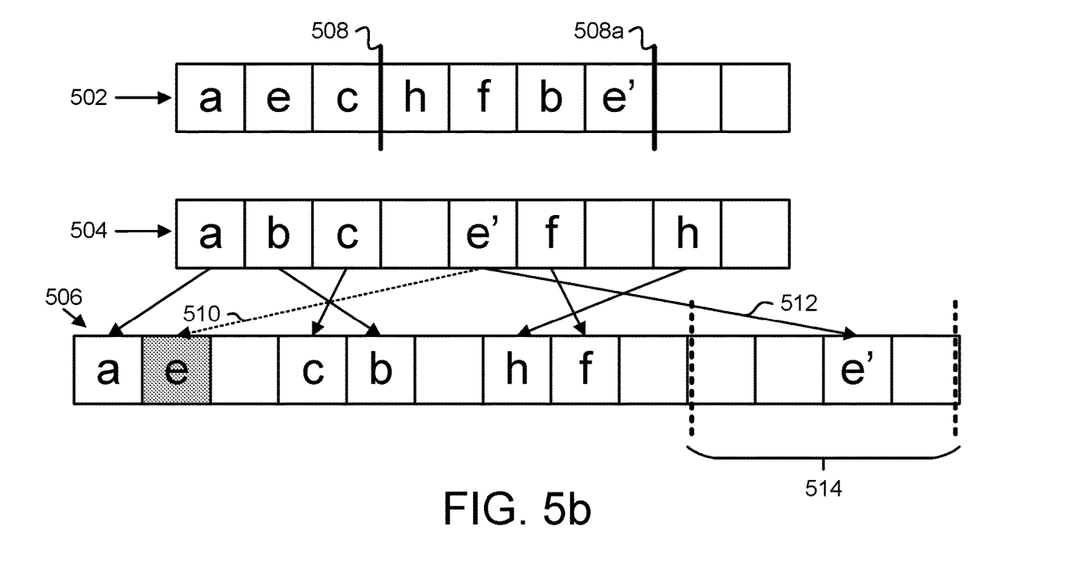
FIG. 5*b* is a schematic block diagram illustrating another example embodiment for dynamically adjusting a journal snapshot window.

FIG. 5b is a schematic block diagram illustrating another example embodiment for dynamically adjusting a journal snapshot window. In FIG. 5b, the failure detection module 202 may detect a failing portion of the disk partition 514, where new data e' has been written (e' being an updated version of e). Using the snapshot window marker 508 as illustrated in FIG. 5a, if that portion of the disk partition fails 514, e' will be lost, however e' is still part of the snapshot window in the journal 502 that has not been committed to the metadata 504. Thus, when the snapshot window in the journal 502 is replayed (in response to system start up, restart, boot, crash recovery, etc.), meaning references to data elements h, f, b, and e' are established in the journal 502, the reference to e' will not be a valid reference because e' is lost or deleted due to being stored in the failing portion 514 of the disk partition 506.

However, if the failure detection module 202 detects the failing portion of the disk partition 514, the snapshot module 206 can dynamically adjust the snapshot window (e.g., adjust the size or the frequency with which the snapshot window is committed to metadata 504) from a default commit point 508 to a new commit point 508a that includes more data in the journal 502 (the snapshot now includes data a, e, c, h, f, b, e' instead of just a, e, c, or h, f, b, e'). Thus, during a replay of the journal 502 or when committing data to the metadata 504, the data elements a, e, c, h, f, b, e' will be referenced in that order; however, the reference 512 to e' will not be valid because the data element e' is stored on the part of the disk partition 506 that may have failed 514, but the reference 510 to the original version of e', e, will still be valid even though e is a stale data element. In this manner, instead of receiving an error that the reference 512 to e' is not valid, which may cause unforeseen or unintended side effects in a host application, the reference 510 to e can be used as a fallback. Furthermore, in certain embodiments, the garbage collection module 302 may dynamically adjust the garbage collection service in response to the detected potential failure so that the stale version of e is not deleted so that it can be used as a fallback in the event of the potential failure.

Figure 6:
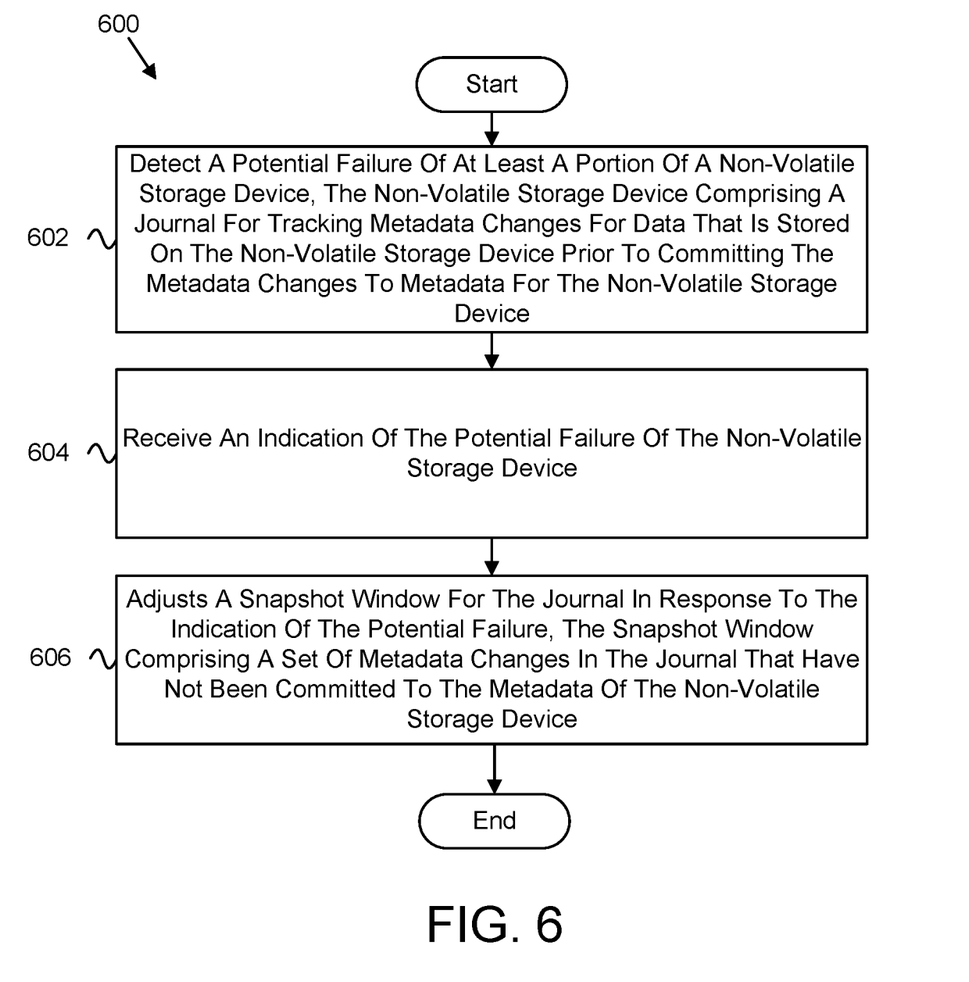
FIG. 6 is a schematic flow chart diagram illustrating one embodiment of a method for dynamically adjusting a journal snapshot window.

FIG. 6 is a schematic flow chart diagram illustrating one embodiment of a method 600 for dynamically adjusting a journal snapshot window. In one embodiment, the method 600 begins and detects 602 a potential failure of a non-volatile storage device 124. The non-volatile storage device 124 includes a journal 128 for tracking metadata changes for data that is stored on the non-volatile storage device 124 prior to committing the metadata changes to metadata 126 for the non-volatile storage device 124.

In further embodiments, the method 600 receives 604 an indication of the potential failure of the non-volatile storage device 124 and adjusts 606 a snapshot window for the journal 128 in response to the indication of the potential failure. The snapshot window comprises a set of metadata changes in the journal 128 that have not been committed to the metadata 126 of the non-volatile storage device 124, and the method 600 ends. In some embodiments, the failure detection module 202, the notification receiving module 204, and the snapshot module 206 perform the various steps of the method 600.

Figure 7:
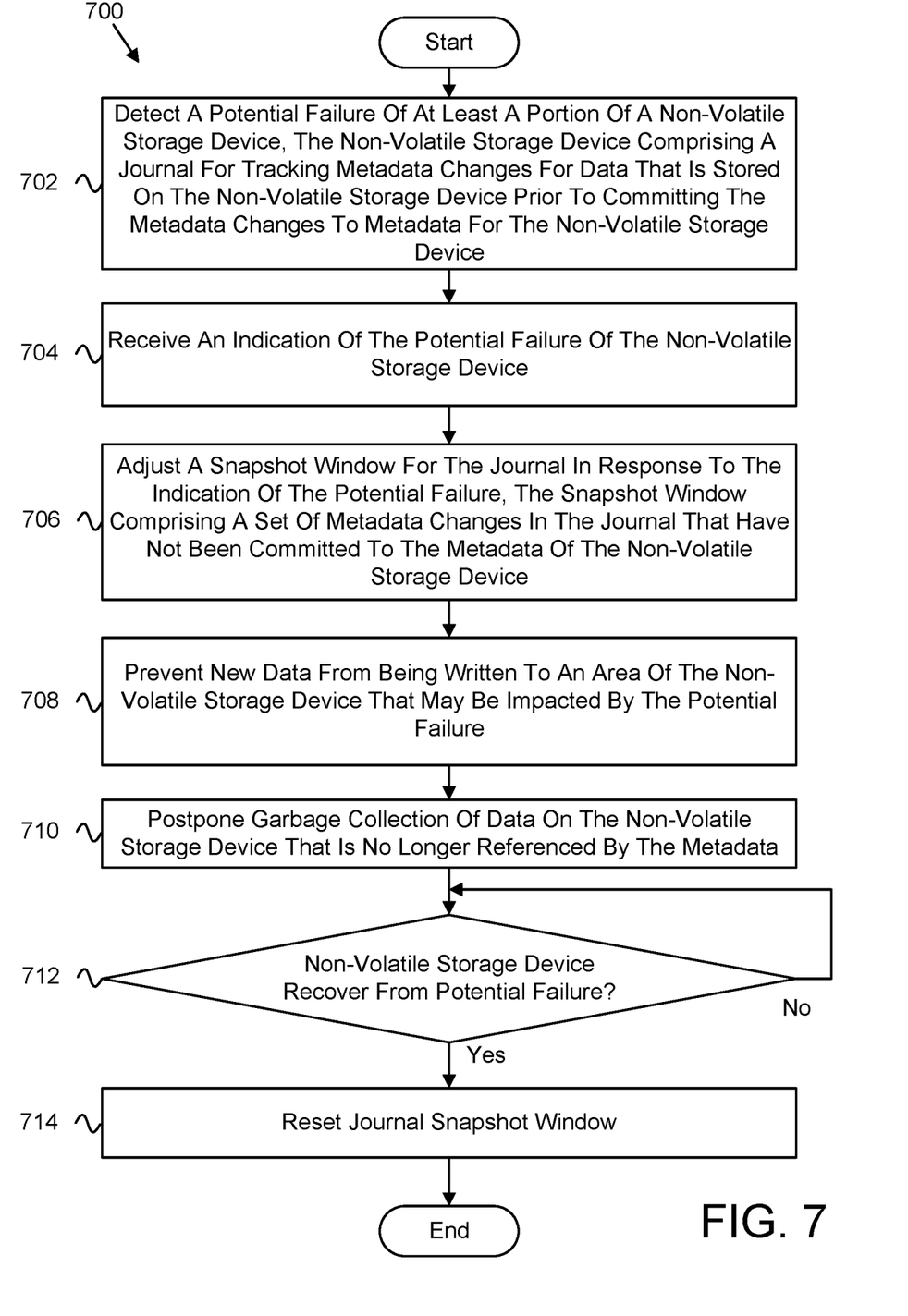
FIG. 7 is a schematic flow chart diagram illustrating one embodiment of another method for dynamically adjusting a journal snapshot window.

FIG. 7 is a schematic flow chart diagram illustrating one embodiment of another method 700 for dynamically adjusting a journal snapshot window. In one embodiment, the method 700 begins and detects 702 a potential failure of a non-volatile storage device 124. The non-volatile storage device 124 includes a journal 128 for tracking metadata changes for data that is stored on the non-volatile storage device 124 prior to committing the metadata changes to metadata 126 for the non-volatile storage device 124.

In further embodiments, the method 700 receives 704 an indication of the potential failure of the non-volatile storage device 124 and adjusts 706 a snapshot window for the journal 128 in response to the indication of the potential failure. The snapshot window comprises a set of metadata changes in the journal 128 that have not been committed to the metadata 126 of the non-volatile storage device 124.

In some embodiments, the method 700 prevents 708 new data from being written to the area of the non-volatile storage device 124 that may be impacted by the potential failure. In one embodiment, the method 700 postpones 710 garbage collection of data on the non-volatile storage device 124 that is no longer referenced by the metadata 126. The method 700 may determine 712 whether the non-volatile storage device 124 has recovered from the potential failure. If not, the method 700 continues to check for disaster recovery; otherwise, the method 700 resets 714 the journal snapshot window (e.g., to a default or predefined state), and the method 700 ends. In some embodiments, the failure detection module 202, the notification receiving module 204, the snapshot module 206, the garbage collection module 302, and the write module 304 perform the various steps of the method 700.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
a failure detection module that detects a potential failure of at least a portion of a non-volatile storage device, the non-volatile storage device comprising a journal for tracking metadata changes for data that is stored on the non-volatile storage device prior to committing the metadata changes to metadata for the non-volatile storage device;
a notification receiving module that receives an indication of the potential failure of the non-volatile storage device; and
a snapshot module that adjusts a snapshot window for the journal in response to the indication of the potential failure, the snapshot window comprising a set of metadata changes in the journal that have not been committed to the metadata of the non-volatile storage device.

2. The apparatus of claim 1, wherein the snapshot module adjusts the snapshot window by increasing a number of metadata changes that are tracked within the snapshot window prior to committing the metadata changes to the metadata of the non-volatile storage device.

3. The apparatus of claim 1, wherein the snapshot module adjusts the snapshot window by reducing a frequency with which the metadata changes within the snapshot window are committed to the metadata of the non-volatile storage device.

4. The apparatus of claim 1, wherein a degree to which the snapshot window is adjusted is determined according to a severity of the potential failure of the non-volatile storage device.

5. The apparatus of claim 1, wherein the failure detection module is further configured to detect that the non-volatile storage device has recovered from the potential failure.

6. The apparatus of claim 5, wherein the failure detection module resets the adjusted snapshot window for the journal in response to detecting that the non-volatile storage device has recovered from the potential failure.

7. The apparatus of claim 1, further comprising a garbage collection module that postpones garbage collection of data on the non-volatile storage device that is no longer referenced by the metadata.

8. The apparatus of claim 7, wherein the garbage collection module postpones garbage collection in response to determining that new data stored on the non-volatile storage device is stored in an area of the non-volatile storage device that may be impacted by the potential failure.

9. The apparatus of claim 7, wherein the garbage collection module resumes normal garbage collection in response to the snapshot window of the journal being committed to the metadata for the non-volatile storage device and in response to the potential failure being resolved.

10. The apparatus of claim 1, further comprising a write module that prevents new data from being written to an area of the non-volatile storage device that may be impacted by the potential failure.

11. The apparatus of claim 1, wherein the failure detection module detects the potential failure of the non-volatile storage device in response to one or more of:
detecting a threshold number of parity errors in a redundant array of independent disks ("RAID") that the non-volatile storage device is part of;
detecting a component in doubt ("CID") associated with the non-volatile storage device;
detecting a threshold write latency for the non-volatile storage device; and
detecting a threshold number of read errors when using the metadata to read from the non-volatile storage device.

12. A method, comprising:
detecting a potential failure of at least a portion of a non-volatile storage device, the non-volatile storage device comprising a journal for tracking metadata changes for data that is stored on the non-volatile storage device prior to committing the metadata changes to metadata for the non-volatile storage device;
receiving an indication of the potential failure of the non-volatile storage device; and
adjusting a snapshot window for the journal in response to the indication of the potential failure, the snapshot window comprising a set of metadata changes in the journal that have not been committed to the metadata of the non-volatile storage device.

13. The method of claim 12, wherein adjusting the snapshot window comprises increasing a number of metadata changes that are tracked within the snapshot window prior to committing the metadata changes to the metadata of the non-volatile storage device.

14. The method of claim 12, wherein adjusting the snapshot window comprises reducing a frequency with which the metadata changes within the snapshot window are committed to the metadata of the non-volatile storage device.

15. The method of claim 12, wherein the degree to which the snapshot window is adjusted is determined according to a severity of the potential failure of the non-volatile storage device.

16. The method of claim 12, further comprising:
detecting that the non-volatile storage device has recovered from the potential failure; and
resetting the adjusted snapshot window for the journal in response to detecting that the non-volatile storage device has recovered from the potential failure.

17. The method of claim 12, further comprising postponing garbage collection of data on the non-volatile storage device that is no longer referenced by the metadata.

18. The method of claim 17, further comprising postponing garbage collection in response to determining that new data stored on the non-volatile storage device is stored in an area of the non-volatile storage device that may be impacted by the potential failure.

19. The method of claim 17, further comprising resuming normal garbage collection in response to the snapshot window of the journal being committed to the metadata for the non-volatile storage device and in response to the potential failure being resolved.

20. A computer program product, comprising a computer readable storage medium having program instructions embodied therewith, the program instructions executable by a processor to cause the processor to:
- detect, by processor, a potential failure of at least a portion of a non-volatile storage device, the non-volatile storage device comprising a journal for tracking metadata changes for data that is stored on the non-volatile storage device prior to committing the metadata changes to metadata for the non-volatile storage device;
- receive, by processor, an indication of the potential failure of the non-volatile storage device; and
- adjust, by processor, a snapshot window for the journal in response to the indication of the potential failure, the snapshot window comprising a set of metadata changes in the journal that have not been committed to the metadata of the non-volatile storage device.

\* \* \* \* \*